COLOR TELEVISION CAMERA

Filed Dec. 29, 1951

INVENTOR
William L. Behrend
BY
Olin V. Mitchell
ATTORNEY

Patented June 9, 1953

2,641,642

UNITED STATES PATENT OFFICE 2,641,642

COLOR TELEVISION CAMERA

William L. Behrend, Princeton, N. J., assignor to Radio Corporation of America, a corporation of Delaware Application December 29, 1951, Serial No. 264,020

6 Claims. (Cl. 178—5.4)

This invention relates to the type of television cameras adapted to derive a wide band brightness signal and narrow band signals representative of the intensity variations of each of the primary colors.

According to one feature of this invention the problem of registration of the different signals is materially reduced by deriving the full band brightness signals with one pickup tube and the low frequency color signals with another pickup tube.

The low frequency color signals could be derived by inserting a vertical color strip filter in the optical path from the scene to the color pickup tube. In each group of strips, successive strips pass light of a different primary color. However, any nonlinearity in the scanning or any variation in the phase of the line scanning interval would shift the time of occurrence of the different color signals so as to make it difficult to properly separate them.

Therefore, in accordance with another feature of this invention means are provided for keying the different color signals into corresponding color channels, irrespective of variations in phase or lack of linearity in the scanning action of the electron beam in the color pickup tube.

This latter feature of the invention may be realized by inserting keying strips between at least some of said groups of color strips and employing the signals generated as the electron beam of the color pickup tube scans across areas of its target in registry with said keying strips to gate the signals derived as the beam scans across areas in registry with the respective color strips.

In such an arrangement the keying pulses are passed through one channel and all the signals are passed through another channel. Variation in scanning linearity causes corresponding variations in the frequency of the keying pulses and the different color signals. Because the two channels normally have different amounts of delay, their phase versus frequency characteristics are different, and consequently the phase relationship between the keying pulses and the color signals varies. Under these conditions the color signals may be gated into incorrect channels.

In accordance with another feature of this invention therefore means are provided for holding a constant phase relationship between the color signals passing through one channel and the keying pulses that have been passed through the other.

This may be done by inserting a phase shifter in one channel and a delay means in the other. The delay circuit makes the slope of the phase versus frequency characteristic of the two channels identical over the band of frequencies generated due to non-linearity of the sweep and the phase shifter brings them into phase.

Figure 1:
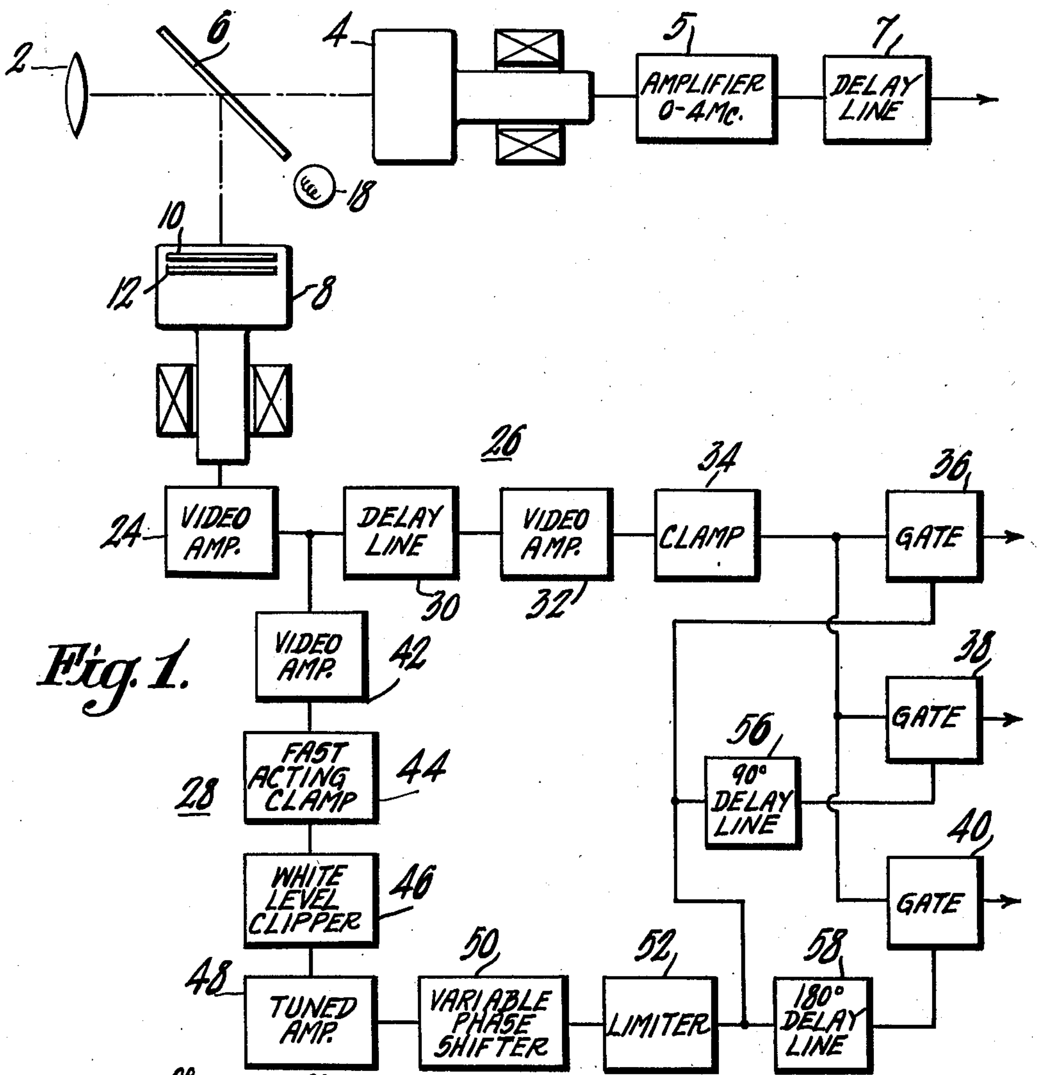

The manner in which the above features of the invention may be realized will be more clearly understood after detailed consideration of the drawings in which:

Figure 1 is a block diagram illustrating the one embodiment of the invention.

Figure 2:
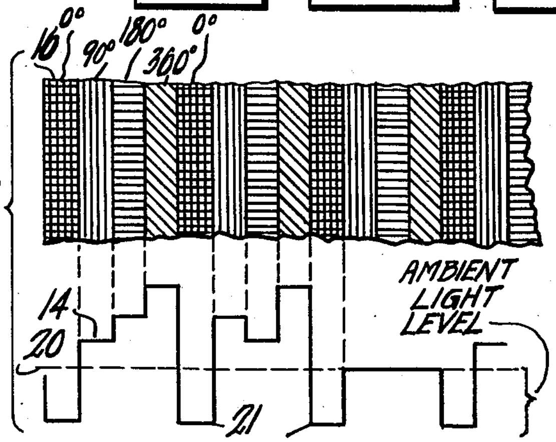
Figure 3:
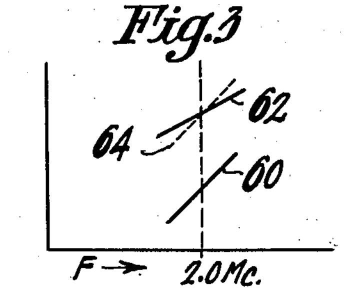

Figure 2 shows a section of one form of optical strip filter that may be used and in addition a simple wave form that may be generated by the color tube as its beam scans across areas that are in registry with the various strips of the filter; and Figure 3 is a diagram illustrating the phase versus frequency characteristic of the keying pulse channel and the signal channel that is useful in explaining the operation of the circuits in Figure 1.

Turning now to Figure 1, there is shown an optical lens 2 mounted so as to focus light from the scene to be televised onto the target of a standard black and white full band pickup tube 4. The output of this tube is a brightness signal and is applied to a suitable transmission means via a video amplifier 5. A delay line 7 is connected to the output of the amplifier 5 so as to equalize the times at which the brightness signal and the color signals, that pass through circuits described below, may arrive at the transmission means in proper phase relationship. A partially reflecting mirror 6 is mounted between the lens 2 and the brightness pickup tube 4 so as to reflect some of the light from the scene onto the face of a color pickup tube 8.

One manner in which the color pickup tube 8 may be constructed is as follows. A vertical color strip optical filter 10 having groups of red, blue and green strip filter separated by opaque strips as shown in Figure 2 is mounted on the object side of a target 12. If the pickup tube 8 is of the orthicon type, the target 12 may be comprised of a mica sheet having a mosaic of photo-emissive material deposited on the beam side. Thus as the beam scans across the target it will successively generate video signals having amplitudes corresponding to the amount of light coming through the red, blue and green filter strips respectively. A typical signal is indicated by the wave form 14 in Figure 2. As the beam scans across the opaque strips 16 the video signal has a minimum or zero amplitude. The pickup tube 8 is illuminated by a light 18 so that even in the black areas of a scene some light comes through the red, blue and green optical filter strips and no light goes through the opaque strip 16. The amount of light passing through the color filter strips is indicated by the dotted line 20 of Figure 2. Therefore, the negative pulses 21 that are generated when the beam scans across the opaque strip 16 always are of less amplitude than at the signals generated when the beam scans across the color filter strips in a black area of a scene.

Alternatively, the color strip filter could be mounted outside the tube in which case the object lens would focus the scene on it and a relay lens would be inserted between the filter and the target of the tube so as to image the filter on the target.

The signals generated by the color pickup tube are passed through a video amplifier 24 to a signal channel 26 and a keying channel 28. The signal channel 26 is comprised of a delay circuit 30, video amplifier 32 and a clamp circuit 34. The clamped signals are applied to gating devices 36, 38 and 40. The clamps are adjusted to a reference voltage such that only the portion of the signal above the dotted line 20 or in other words only the scene light is passed through the gates.

The keying channel 28 is comprised of a video amplifier 42, a fast acting clamp 44 that serves to clamp the signals to the negative peaks of the keying pulses 21, and a white level clipping circuit 46 that is set to clip the signals applied to it at the level of the dotted line 20 of Figure 2. In this way only the portion of the keying pulse 21 lying between black level and the dotted line 20 are applied to an amplifier 48 that is tuned to the average frequency of the keying pulses 21 so as to accentuate these pulses and reduce the effects of noise. The output of the tuned amplifier 48 is applied to a variable phase shifter 50 that serves to shift the phase approximately an equal amount for a range of frequencies surrounding the average frequency of the pulse 21. The output of the variable phase shifter 50 is passed through a limiter 52 and is applied to a gate 36, a 90° delay circuit 56, and a 180° delay circuit 58. All the pulses are delayed by 90° by a suitable setting of the phase shifter 50 so that the gates 36, 38 and 40 are rendered conductive as the beam scans across the portions of the target 12 that are in registry with the red, blue and green filter strips respectively.

The overall operation of the apparatus shown in Figure 1 is as follows. As noted above, variations in scanning linearity can produce variations in the frequency of the keying pulse 21. Generally speaking the tuned amplifier 48 has a much larger delay than the signal channel 26, and therefore the phase versus frequency characteristic of the keying channel 28 may be rather steep as indicated by the line 60 of Figure 3. On the other hand the signal channel 26 may have a phase versus frequency characteristic such as indicated by the solid line 62. The delay device 30 increases the slope of the phase versus frequency characteristic of the signal channel 26 so that it is substantially the same as the phase versus frequency characteristic of the keying channel 28 as indicated by the dotted line 64. The phase shifter 50 is then adjusted so that the pulses supplied by the limiter 52 arrive at the gate 36 at the same time as the video signals produced as the beam scans the red areas. The net result is that even though there are variations in the scanning speed of the beam in the color tube 8 and consequent changes in frequency of the keying pulse 21, the color signals passing through the signal channel 26 and keying pulses arrive at the gates 36, 38 and 40 at the proper intervals. The phase delay devices 56 and 58 apply the keying pulse to the gates 38 and 40 so that the gate 38 is capable of passing signals when the beam is opposite the blue strips and the gate 40 is capable of passing signals when the gate is opposite the green strips. If the signal channel 26 has the larger delay, the portion 7 of the delay device 30 and the variable phase shifter 50 are interchanged.

In apparatus where the brightness signal is derived by adding full band color signals, the scanning action of the beams in the pickup tube have to be precisely registered. In the apparatus of this invention, however, precise registration by the scanning action of the beam in the brightness tube 4 does not have to be carefully registered with the scanning action in the color tube 8 for the following reason. It so happens that the eye is highly sensitive to detail in brightness but is much less sensitive to details in color. Therefore even if the signals produced with color tube 8 are not in precise registry with the brightness signals provided by the pickup tube 4 the eye will not be able to notice it.

Various types of sampling or gating circuits may be employed but in the particular arrangement shown the limiter 52 may be the type used in FM receivers. As is well known to those skilled in the art, this type of limiter clips the sine waves applied to it and then by use of tuned circuits forms another sine wave having a fixed peak-to-peak amplitude. The gates 36, 38 and 40 are biased beyond cut-off and the amplitude of the sine wave supplied by the limiter 52 is sufficient to overcome this cut-off bias during a desired portion of its cycle.

What is claimed is:

1. A color television camera comprising the combination of a first pickup tube adapted to supply full band brightness signals, a second pickup tube, each of said tubes having means for projecting a beam of electrons and means adapted to cause said beam to scan a raster, means for focusing the images to be televised onto each of said tubes, a series of line filters mounted in front of said second pickup tube in a direction perpendicular to the lines of the raster scanned by the beam, said strips being adapted to pass light of different component colors, a plurality of gates connected to receive the output signal of said second pickup tube, and means adapted to open said gates in sequence and in synchronism with the scanning of the beam of said second pickup tube across said color filter strips.

2. A color television camera comprising the combination of a first pickup tube adapted to supply brightness signals and a second pickup tube, said pickup tubes having electron guns for producing electron beams and apparatus for causing said beams to scan a raster, optical apparatus for focusing a scene to be televised onto each of said pickup tubes, means for causing the signals generated by said second tube to successively represent the intensity of the different component colors as its beam scans across the raster, a plurality of gating devices connected to the output of said second pickup tube so as to receive said signals, and means for rendering said gates capable of separating and passing said signals.

3. Apparatus for deriving signals representing brightness as well as signals representing the colors of a scene as it is being scanned comprising in combination a first pickup tube adapted to derive signals representing apparent brightness, a second pickup tube adapted to derive low frequency color signals that represent the different selected component colors of a scene in sequence as each line of a raster is being scanned as well as keying pulses extending beyond the amplitude range of said color signals, said keying pulses occurring between at least some of the sequential groups of color signals, means for imaging the scene onto the light responsive areas of each of said pickup tubes, a plurality of gating devices, each of said gating devices being connected so as to receive the color signals provided by said second pickup tube, means for successively keying said gating devices in response to said keying signals so that each gating device is able to pass only one of said color signals.

4. In a color television camera wherein one pickup tube supplies color signals that successively represent the selected component color of a scene as each line of the raster is scanned, and wherein keying signals are interspersed with said color signals, apparatus for distributing signals representing each selected component color to a different output channel comprising in combination a plurality of gating devices, a first channel for coupling said color signals to each of said gates, a second channel including means for selecting said keying signals, and means for coupling said keying signals to said gates at such relative times that each gate is rendered capable of passing signals only when the color signal represents a given selected component color, a delay device connected in series relationship with the channel having the least inherent delay, the amount of said delay being such that the total delay in each channel is equalized and the phase versus frequency characteristics thus have the same slope, and a phase shifter connected in series relationship with the other channel.

5. A color television camera comprising the combination of a first pick-up tube, a second pick-up tube, having means for projecting a beam of electrons and means adapted to cause said beam to scan a raster, means for focusing the images to be televised onto each of said tubes, a series of line filters mounted in front of said second pick-up tube in a direction perpendicular to the lines of the raster scanned by the beam, said strips being adapted to pass a light of different component colors, a plurality of gates connected to receive the output signal of said second pick-up tube, and means adapted to open said gates in sequence and in synchronism with the scanning of the beam of said second pick-up tube across said color filter strips.

6. A color television camera comprising the combination of a first pick-up tube and a second pick-up tube, said pick-up tubes having electron guns for producing electron beams and apparatus for causing said beams to scan a raster, optical apparatus for focusing a scene to be televised onto each of said pick-up tubes, means for causing the signals generated by said second tube to successively represent the intensity of the different component colors as its beam scans across the raster, a plurality of gating devices connected to the output of said second pick-up tube so as to receive said signals, and means for rendering said gates capable of separating and passing said signals.

WILLIAM L. BEHREND.

References Cited in the file of this patent

UNITED STATES PATENTS

| Number | Name | Date |
|---|---|---|
| 2,492,926 | Valensi | Dec. 22, 1949 |
| 2,545,325 | Weimer | Mar. 13, 1951 |
| 2,552,070 | Sziklai | May 8, 1951 |
| 2,579,971 | Schade | Dec. 25, 1951 |